INVENTOR.
ALFRED BRUNNER.
BY K. A. Mayr
ATTORNEY.

United States Patent Office 3,266,600
Patented August 16, 1966

3,266,600
HYDRAULIC VIBRATION DAMPER
Alfred Brunner, Winterthur, Switzerland, assignor to Sulzer Freres, S.A., Winterthur, Switzerland, a corporation of Switzerland
Filed Feb. 19, 1962, Ser. No. 174,159
Claims priority, application Switzerland, Feb. 24, 1961, 2,280/61
12 Claims. (Cl. 188—1)

The present invention relates to a hydraulic vibration damper having a damping mass providing inertia. The vibration damper according to the invention is suitable for damping transverse vibrations or horizontal movements caused by wind forces in the upper portion of a tall, slender, vertical structure such as a smokestack, tower or pole.

Vibration dampers are known which have a rigid damping mass which acts on the vibrating element through an oil film. The damping mass follows the movement of the vibrating element at a smaller amplitude and at a displacement of phase, causing a relative movement between the damping mass and the vibrating element and a dissipation of energy in the viscous oil film. Withdrawal of this energy from the vibrating system effects the desired damping.

In the aforesaid conventional vibration damper, a solid damping mass must be movably supported in a housing and there is initial friction between the damping mass and the housing which must be overcome by a vibration movement whose acceleration exceeds a certain minimum value before the vibration damper begins to function. The parts which are in frictional engagement are subject to corrosion and other effects which cause jamming and blocking of the damping mass, rendering the vibration damper ineffective.

It is an object of the present invention to provide a vibration damper which overcomes the disadvantages of conventional dampers and which reacts to minute accelerations.

A further object of the invention resides in the provision of a vibration damper whose dimensions for a certain vibrating system can be accurately precalculated.

The vibration damper according to the invention is of the hydraulic type and uses a viscous liquid as damping mass.

The novel features which are considered characteristic of the invention are set forth with particularity in the appended claims. The invention itself, however, and additional objects and advantages thereof will best be understood from the following description of embodiments thereof when read in connection with the accompanying drawing, wherein:

Figure 1:
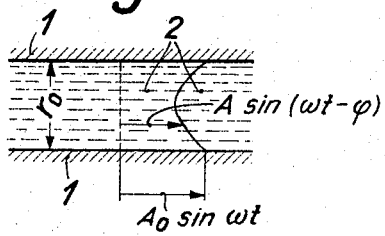
FIG. 1 is a schematic illustration showing the principle of the invention.

Referring more particularly to FIG. 1 of the drawing, numeral 1 designates two rigidly connected parallel plates and numeral 2 designates a viscous liquid, for example a mineral oil, filling the space between the plates 1. The plates oscillate in the longitudinal direction according to the equation $x_0 = A_0 \sin \omega t$.

The liquid between the plates oscillates in the same direction according to the equation $x = A \sin(\omega t - \varphi)$ whereby $A$ and $\varphi$ are dependent on the distance between the plates.

The behavior of the liquid can be expressed in a nondimensional manner by the following formula $$\frac{E \cdot \omega^2}{G \cdot g} = \left(A_0 \frac{\omega^2}{g}\right)^2 \cdot e$$

wherein $E$ represents the energy absorbed per vibration in m.-kg.,
$G$ represents the weight of the damping liquid in kg.,
$\omega$ represents the cyclic frequency of the harmonic oscillation in L/S,
$g$ represents the acceleration due to gravity, m./s.²,
$A_0$ represents the amplitude of the oscillation of the plates in m.,
$e$ represents a nondimensional energy absorption number.

Figure 2:
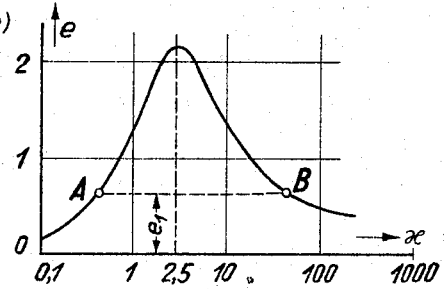
FIG. 2 is a diagram showing the energy absorption $e$ of a vibration damping liquid relative to a coefficient $\aleph$.

As seen in FIG. 2, the energy absorption number $e$ depends on the nondimensional number $$\aleph = \frac{\omega}{\nu} \cdot r_0^2$$

wherein $\nu$ represents the kinematic viscosity of the damping fluid in m.²/s., and
$r_0$ the distance between the plates in m.

FIG. 2 shows that the energy absorption $e$ due to internal friction of the liquid is at a maximum at $\aleph = 2.5$. Therefore, the required weight of the damping liquid can be a minimum if the distance between the plates $r_0$ and the kinematic viscosity are chosen according to the frequency of the oscillation. For all practical purposes a satisfactory damping effect can be produced if $\aleph$ is between $\frac{1}{10}$ and 100 whereby $e$ reaches its maximum value.

Figure 3:
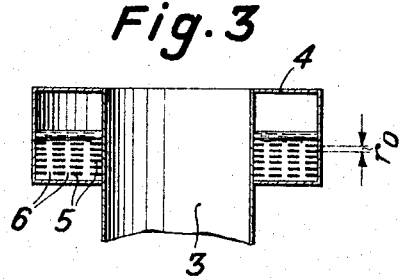
FIG. 3 is a diagrammatic cross sectional illustration of a vibration damper according to the invention.

FIG. 3 shows a vibration damper embodying the foregoing considerations. An annular casing 4 is mounted to the top 3 of a smokestack, for example, of a power plant. Horizontal plates 5 are mounted in the casing 4 at a vertical distance $r_0$ from each other. The plates are covered with oil which moves between the plates upon transversal swinging of the top of the smokestack and thereby effects damping of the oscillations. At each oscillation oil must be able to escape in an upward direction. To facilitate this escape of oil holes 6 are provided in the plates 5.

Figure 5:
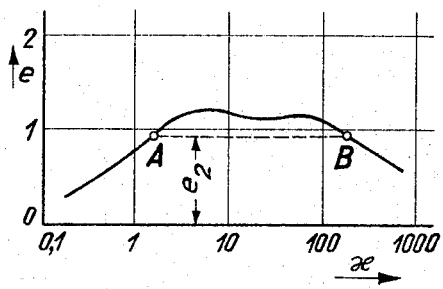
FIG. 5 is a diagram showing the energy absorption $e$ of a vibration damping liquid relative to a coefficient $\aleph$ in a damper according to FIG. 4.
Figure 4:
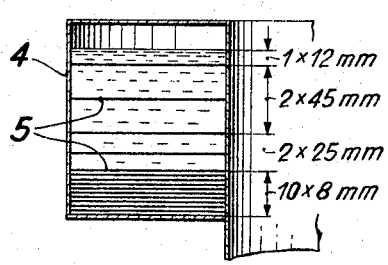
FIG. 4 is a diagrammatic cross sectional illustration of a portion of a modified vibration damper according to the invention.

In order to reduce the cost of the damping liquid mineral oils are preferably used which have a relatively steep viscosity-temperature curve, in contradistinction to silican oils. The kinematic viscosity of the mineral oils changes sometimes considerably, for example, at the ratio 1:100. Considering this change of viscosity the system shown in FIG. 3 can be operated only between the points A and B of the curve shown in FIG. 2 where the $e$ values are relatively low ($e_1$). The $e$-value within the operating range may be increased by providing different plate spacings in the vibration damper. In this way the $e$-curve can be deformed as shown in FIG. 5, which is produced by a damper as shown in FIG. 4, having fourteen plates 5 of which the spacing between ten plates is 8 mm. whereas two plates above the aforementioned ten plates are spaced 25 mm. and the two topmost plates are spaced 45 mm. In the aforedescribed arrangement the $e$-values ($e_2$) pertaining to the operating limits A and B are higher than in an arrangement where the distances between all plates are equal, as shown in FIG. 2. The plates 5 of the damper shown in FIG. 4 are also provided with holes 6 which are not shown in FIG. 4.

Figure 6:
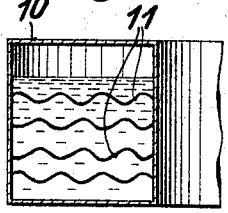
FIGS. 6 to 8 are cross sectional illustrations of parts of three further modifications of a vibration damper according to the invention.

FIG. 6 shows a modification comprising corrugated plates 11 placed within a casing 10 and covered by a viscous liquid. The corrugations produce the same result as the unequal spacing of the plates shown in FIG. 4. The dimensions of an apparatus as shown in FIG. 6 cannot be exactly precalculated but must be empirically determined. The plates 11 are provided with holes, not shown.

Figure 7:
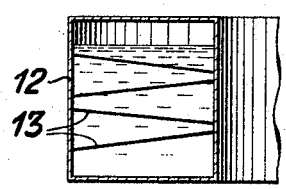

In the modification shown in FIG. 7 the unequal spacing effect is obtained by placing plates 13 in inclined position in a casing 12. The plates converge pairwise. Instead of using inclined plane plates, plates of frustoconical cross section may be used.

Figure 8:
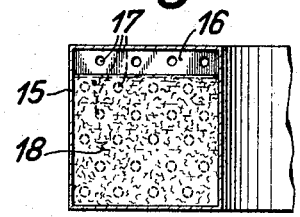

In the embodiment shown in FIG. 8 substantially radially placed separating walls 16, provided with holes 17, are arranged. The separating walls 16 form compartments containing a fibrous, relatively stiff material 18, for example, metal shavings which swing with the casing 15 as well as a viscous liquid in contact with at least a portion of the fibrous material thereby constituting a damping mass counteracting the movements of the oscillating element by its inertia.

I claim:

1. A hydraulic damper for damping the movements of an oscillating element, comprising a casing connected to the oscillating element, a plurality of plates vertically disposed with respect to each other placed inside said casing, the neighboring plates being inclined from a respective horizontal plane in opposite directions to converge with respect to each other liquid inside said casing and being in contact with at least a portion of each of said plates, said liquid constituting a damping mass counteracting the movements of the oscillating element by the inertia of said liquid.

2. A hydraulic damper for damping the movements of an oscillating element, comprising a casing extending around the oscillating element, a plurality of plates placed inside said casing and extending around the oscillating element, said plates forming frustoconical surfaces, and a viscous liquid inside said casing and being in contact with at least a portion of each of said plates, said liquid constituting a damping mass counteracting the movements of the oscillating element by the inertia of said liquid.

3. A hydraulic damper for damping the movements of an oscillating element, comprising a casing connected to the oscillating element, a fibrous material placed inside said casing, means placed inside said casing for maintaining the relative position of said casing and of said material, and a viscous liquid within said casing and in contact with at least a portion of said fibrous material, said liqud constituting a damping mass counteracting the movements of the oscillating element by the inertia of said liquid.

4. A hydraulic damper as defined in claim 3 wherein said fibrous material consists of metal shavings.

5. In combination with a tall, slender, vertical structure, such as a smokestack, having an upper portion:
a hydraulic damper connected to said upper portion for damping horizontal movements of said upper portion caused by wind forces from any direction,
said hydraulic damper comprising a casing connected to and extending around said upper portion,
separating means in said casing dividing the interior of said casing into a plurality of spaces,
said separating means having a plurality of openings providing communication of adjacent ones of said spaces, and
a viscous liquid filling a portion of said casing.

6. In combination with a tall, slender, vertical structure, such as a smokestack, having an upper portion:
a hydraulic damper connected to said upper portion for damping horizontal movements of said upper portion caused by wind forces from any direction,
said hydraulic damper comprising a casing connected to said upper portion,
separating means in said casing dividing the interior of said casing into a plurality of spaces,
said separating means being formed by substantially horizontal walls having a plurality of openings providing communication of adjacent ones of said spaces, and
a viscous liquid filling a portion of said casing.

7. In the combination defined in claim 6 and wherein said walls are formed by substantially parallel and equally spaced plates.

8. In the combination defined in claim 6 and wherein said walls are formed by parallel, plane plates, at least a plurality of said plates being unequally spaced.

9. In the combination defined in claim 6 and wherein said walls are formed by corrugated plates.

10. In the combination defined in claim 6 and wherein said walls are formed by plates, and opposite portions of neighboring ones of said plates are differently spaced.

11. In the combination defined in claim 6 and wherein said walls are formed by plates placed in the lower part of said casing, and the upper portion of said casing is free of separating means.

12. In combination with a tall, slender, vertical structure, such as a smokestack, having an upper portion:
a hydraulic damper connected to said upper portion for damping horizontal movements of said upper portion caused by wind forces from any direction,
said hydraulic damper comprising a casing extending around said upper portion,
vertical walls in said casing subdividing the interior of said casing into a plurality of spaces,
fibrous material placed within said spaces and being movable with said casing, and
a viscous liquid filling a portion of said casing.

References Cited by the Examiner

UNITED STATES PATENTS

| | | | |
|---|---|---|---|
| 1,141,099 | 6/1915 | Anschutz-Kaempfe | 74—5.5 X |
| 1,230,205 | 6/1917 | Nichols | 74—574 |
| 1,346,755 | 7/1920 | Lanchester | 74—574 |
| 2,002,561 | 5/1935 | Wike | 74—572 X |
| 2,403,478 | 7/1946 | Burnat | 74—574 |
| 2,464,362 | 3/1949 | Wilson | 7—574 |
| 2,814,462 | 11/1957 | De Jarnett | 74—573 X |

FOREIGN PATENTS 118,033    6/1930    Austria.

MILTON KAUFMAN, *Primary Examiner.*

BROUGHTON G. DURHAM, *Examiner.*

T. W. SHEAR, *Assistant Examiner.*